United States Patent
Toyoda

(10) Patent No.: US 10,044,957 B2
(45) Date of Patent: Aug. 7, 2018

(54) IMAGING DEVICE AND IMAGING METHOD

(71) Applicant: Olympus Corporation, Hachioji-shi, Tokyo (JP)

(72) Inventor: Tetsuya Toyoda, Hachioji (JP)

(73) Assignee: Olympus Corporation, Tokyo (JP)

( * ) Notice: Subject to any disclaimer, the term of this patent is extended or adjusted under 35 U.S.C. 154(b) by 104 days.

(21) Appl. No.: 15/346,905

(22) Filed: Nov. 9, 2016

(65) Prior Publication Data

US 2017/0104943 A1 Apr. 13, 2017

Related U.S. Application Data

(63) Continuation of application No. PCT/JP2015/059034, filed on Mar. 25, 2015.

(30) Foreign Application Priority Data

Jun. 5, 2014 (JP) .................................. 2014-116511

(51) Int. Cl.
*H04N 5/365* (2011.01)
*H04N 9/07* (2006.01)
(Continued)

(52) U.S. Cl.
CPC ....... *H04N 5/3653* (2013.01); *H04N 5/23212* (2013.01); *H04N 5/347* (2013.01); *H04N 5/3696* (2013.01); *H04N 9/07* (2013.01)

(58) Field of Classification Search
CPC .... H04N 5/3653; H04N 9/07; H04N 5/23212; H04N 5/3696; H04N 5/347
(Continued)

(56) References Cited

U.S. PATENT DOCUMENTS

2005/0270401 A1 12/2005 Hatano
2010/0245631 A1* 9/2010 Hoda .................... G03B 13/36
348/241
(Continued)

FOREIGN PATENT DOCUMENTS

WO WO 2010/004728 A1 1/2010

OTHER PUBLICATIONS

International Search Report to corresponding International Patent Application No. PCT/JP2015/059034, dated Jun. 23, 2015 (1 pg.), with translation (1 pg.).
(Continued)

*Primary Examiner* — Lin Ye
*Assistant Examiner* — Chant T Nguyen
(74) *Attorney, Agent, or Firm* — John C. Pokotylo; Pokotylo Patent Services

(57) ABSTRACT

An imaging device comprising: an image sensor includes a first focus detection pixel being arranged at a position corresponding to a first color filter of the imaging pixel, and a second focus detection pixel being arranged at a position corresponding to a second color filter, a read-out section mixes a plurality of pixel signals including the output of the first focus detection pixel and reads out a first mixed pixel output, in mixing and reading out the outputs of the imaging pixels corresponding to the first color filter, while the read-out section mixes a plurality of pixel signals without including the output of the second focus detection pixel and reads out a second mixed pixel output, in mixing and reading out the outputs of the imaging pixels corresponding to the second color filter.

9 Claims, 12 Drawing Sheets

(51) Int. Cl.
*H04N 5/232* (2006.01)
*H04N 5/369* (2011.01)
*H04N 5/347* (2011.01)

(58) Field of Classification Search
USPC .......................................................... 348/349
See application file for complete search history.

(56) References Cited

U.S. PATENT DOCUMENTS

2012/0320241 A1* 12/2012 Sugawara ............ H04N 5/3696
348/246
2013/0258155 A1* 10/2013 Ueda ........................ H04N 5/21
348/308
2015/0062374 A1 3/2015 Okazawa

OTHER PUBLICATIONS

Anonymous; "Dual Pixel CMOS AF will change the basic assumptions about Digital SLRs," *Interviews with Developers*, at www.learn.usa.canon.com/app/pdfs/articles/Canon_Developers_Interview_nonfacing_pressquality.pdf, 8 pgs. (Canon Oct. 8, 2013).
Extended European Search Report to corresponding European Patent Application No. 15803113.8, dated Dec. 15, 2017 (12 pgs.).

* cited by examiner

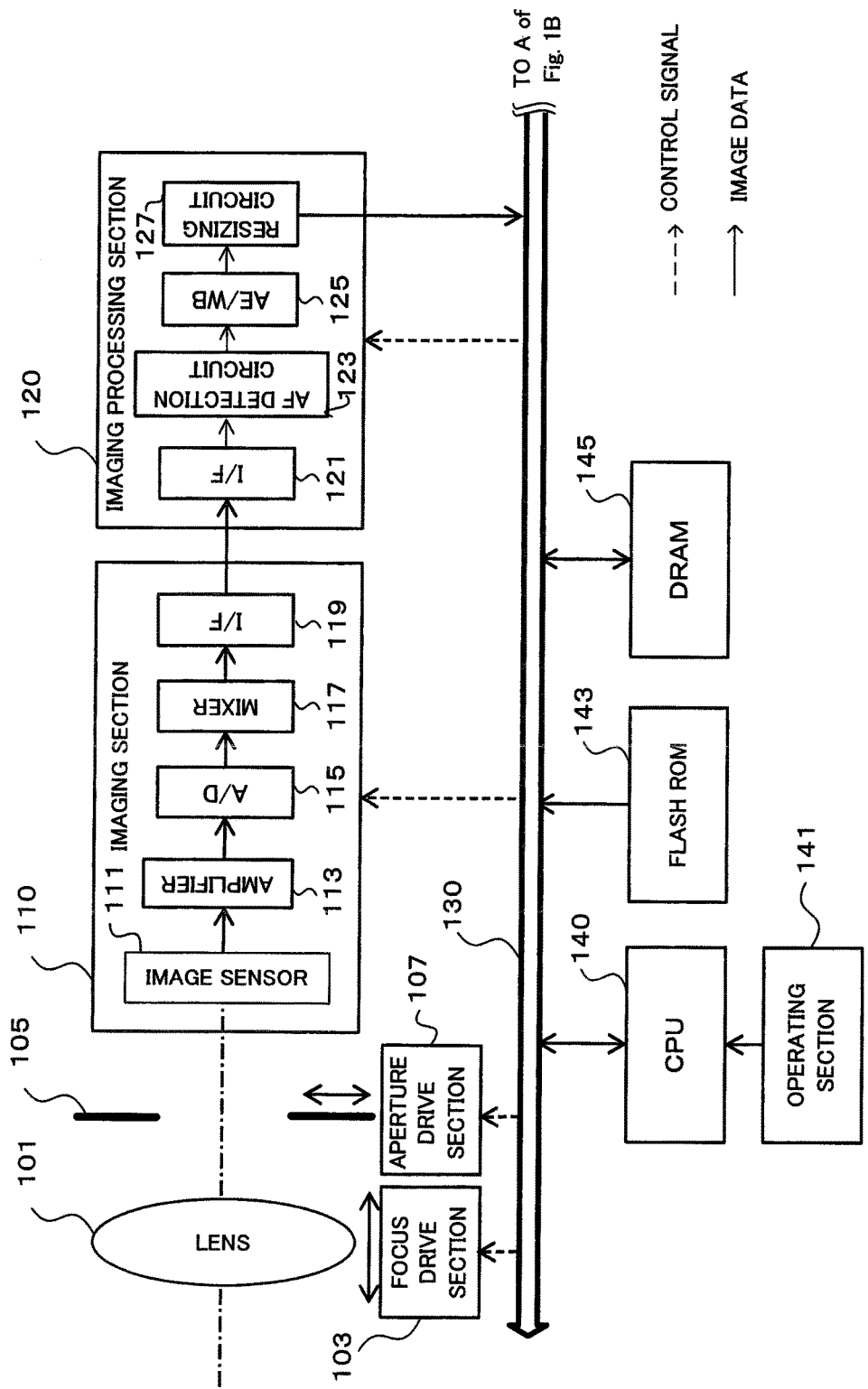

FIG. 3

|     | x1 | x2 | x3 | x4 | x5 | x6 | x7 | x8 | x9 | x10 | x11 | x12 | x13 | x14 | x15 | x16 |
|-----|----|----|----|----|----|----|----|----|----|-----|-----|-----|-----|-----|-----|-----|
| y1  | LF | R  | Gr | R  | RI | R  | Gr | R  | LF | R   | Gr  | R   | RI  | R   | Gr  | R   |
| y2  | B  | Gb | B  | Gb | B  | Gb | B  | Gb | B  | Gb  | B   | Gb  | B   | Gb  | B   | Gb  |
| y3  | Gr | R  | Gr | R  | Gr | R  | Gr | R  | Gr | R   | Gr  | R   | Gr  | R   | Gr  | R   |
| y4  | B  | Gb | TP | Gb | B  | Gb | TP | Gb | B  | Gb  | TP  | Gb  | B   | Gb  | TP  | Gb  |
| y5  | LF | R  | Gr | R  | RI | R  | Gr | R  | LF | R   | Gr  | R   | RI  | R   | Gr  | R   |
| y6  | B  | Gb | B  | Gb | B  | Gb | B  | Gb | B  | Gb  | B   | Gb  | B   | Gb  | B   | Gb  |
| y7  | Gr | R  | Gr | R  | Gr | R  | Gr | R  | Gr | R   | Gr  | R   | Gr  | R   | Gr  | R   |
| y8  | B  | Gb | BT | Gb | B  | Gb | BT | Gb | B  | Gb  | BT  | Gb  | B   | Gb  | BT  | Gb  |
| y9  | LF | R  | Gr | R  | RI | R  | Gr | R  | LF | R   | Gr  | R   | RI  | R   | Gr  | R   |
| y10 | B  | Gb | B  | Gb | B  | Gb | B  | Gb | B  | Gb  | B   | Gb  | B   | Gb  | B   | Gb  |
| y11 | Gr | R  | Gr | R  | Gr | R  | Gr | R  | Gr | R   | Gr  | R   | Gr  | R   | Gr  | R   |
| y12 | B  | Gb | TP | Gb | B  | Gb | TP | Gb | B  | Gb  | TP  | Gb  | B   | Gb  | TP  | Gb  |
| y13 | LF | R  | Gr | R  | RI | R  | Gr | R  | LF | R   | Gr  | R   | RI  | R   | Gr  | R   |
| y14 | B  | Gb | B  | Gb | B  | Gb | B  | Gb | B  | Gb  | B   | Gb  | B   | Gb  | B   | Gb  |
| y15 | Gr | R  | Gr | R  | Gr | R  | Gr | R  | Gr | R   | Gr  | R   | Gr  | R   | Gr  | R   |
| y16 | B  | Gb | BT | Gb | B  | Gb | BT | Gb | B  | Gb  | BT  | Gb  | B   | Gb  | BT  | Gb  |

FIG. 4B

|    | x1 | x2 | x3 | x4 | x5 | x6 | x7 | x8 | x9 | x10 | x11 | x12 | x13 | x14 | x15 | x16 |
|----|----|----|----|----|----|----|----|----|----|-----|-----|-----|-----|-----|-----|-----|
| y1 | LF | R | Gr | R | RI | R | Gr | R | LF | R | Gr | R | RI | R | Gr | R |
| y2 | B | Gb | B | Gb | B | Gb | B | Gb | B | Gb | B | Gb | B | Gb | B | Gb |
| y3 | Gr | R | Gr | R | Gr | R | Gr | R | Gr | R | Gr | R | Gr | R | Gr | R |
| y4 | B | Gb | TP | Gb | B | Gb | TP | Gb | B | Gb | TP | Gb | B | Gb | TP | Gb |
| y5 | LF | R | Gr | R | RI | R | Gr | R | LF | R | Gr | R | RI | R | Gr | R |
| y6 | B | Gb | B | Gb | B | Gb | B | Gb | B | Gb | B | Gb | B | Gb | B | Gb |
| y7 | Gr | R | Gr | R | Gr | R | Gr | R | Gr | R | Gr | R | Gr | R | Gr | R |
| y8 | B | Gb | BT | Gb | B | Gb | BT | Gb | B | Gb | BT | Gb | B | Gb | BT | Gb |
| y9 | LF | R | Gr | R | RI | R | Gr | R | LF | R | Gr | R | RI | R | Gr | R |
| y10 | B | Gb | B | Gb | B | Gb | B | Gb | B | Gb | B | Gb | B | Gb | B | Gb |
| y11 | Gr | R | Gr | R | Gr | R | Gr | R | Gr | R | Gr | R | Gr | R | Gr | R |
| y12 | B | Gb | TP | Gb | B | Gb | TP | Gb | B | Gb | TP | Gb | B | Gb | TP | Gb |
| y13 | LF | R | Gr | R | RI | R | Gr | R | LF | R | Gr | R | RI | R | Gr | R |
| y14 | B | Gb | B | Gb | B | Gb | B | Gb | B | Gb | B | Gb | B | Gb | B | Gb |
| y15 | Gr | R | Gr | R | Gr | R | Gr | R | Gr | R | Gr | R | Gr | R | Gr | R |
| y16 | B | Gb | BT | Gb | B | Gb | BT | Gb | B | Gb | BT | Gb | B | Gb | BT | Gb |

FIG. 4D

|   | x1 | x2 | x3 | x4 | x5 | x6 | x7 | x8 | x9 | x10 | x11 | x12 | x13 | x14 | x15 | x16 |
|---|----|----|----|----|----|----|----|----|----|-----|-----|-----|-----|-----|-----|-----|
| y1 | LF | R | Gr | R | Gr | R | RI | R | Gr | R | Gr | R | LF | R | Gr | R |
| y2 | B | Gb | B | Gb | B | Gb | B | Gb | B | Gb | B | Gb | B | Gb | B | Gb |
| y3 | Gr | R | Gr | R | Gr | R | Gr | R | Gr | R | Gr | R | Gr | R | Gr | R |
| y4 | B | Gb | TP | Gb | B | Gb | B | Gb | TP | Gb | B | Gb | B | Gb | TP | Gb |
| y5 | Gr | R | Gr | R | Gr | R | Gr | R | Gr | R | Gr | R | Gr | R | Gr | R |
| y6 | B | Gb | B | Gb | B | Gb | B | Gb | B | Gb | B | Gb | B | Gb | B | Gb |
| y7 | LF | R | Gr | R | Gr | R | RI | R | Gr | R | Gr | R | LF | R | Gr | R |
| y8 | B | Gb | B | Gb | B | Gb | B | Gb | B | Gb | B | Gb | B | Gb | B | Gb |
| y9 | Gr | R | Gr | R | Gr | R | Gr | R | Gr | R | Gr | R | Gr | R | Gr | R |
| y10 | B | Gb | BT | Gb | B | Gb | B | Gb | BT | Gb | B | Gb | B | Gb | BT | Gb |
| y11 | Gr | R | Gr | R | Gr | R | Gr | R | Gr | R | Gr | R | Gr | R | Gr | R |
| y12 | B | Gb | B | Gb | B | Gb | B | Gb | B | Gb | B | Gb | B | Gb | B | Gb |
| y13 | LF | R | Gr | R | Gr | R | RI | R | Gr | R | Gr | R | LF | R | Gr | R |
| y14 | B | Gb | B | Gb | B | Gb | B | Gb | B | Gb | B | Gb | B | Gb | B | Gb |
| y15 | Gr | R | Gr | R | Gr | R | Gr | R | Gr | R | Gr | R | Gr | R | Gr | R |
| y16 | B | Gb | BT | Gb | B | Gb | BT | Gb | B | Gb | BT | Gb | B | Gb | BT | Gb |

__

IMAGING DEVICE AND IMAGING METHOD

CROSS-REFERENCE TO RELATED APPLICATIONS

This application is a Continuation Application of PCT Application No. PCT/JP2015/059034, filed on Mar. 25, 2015 and based upon and claiming the benefit of priority from prior Japanese Patent Application No. 2014-116511, filed on Jun. 5, 2014, the entire contents of all of which are incorporated herein by reference.

BACKGROUND OF THE INVENTION

1. Field of the Invention

The present invention relates to an imaging device having an image sensor including a plurality of imaging pixels and a plurality of focus detection pixels and to an imaging method.

2. Description of the Related Art

A technique has been put into practical use, which arranges, in a part of an image sensor, a focus detection pixel (referred to also as a phase-difference pixel) for detecting a phase difference, obtains phase-difference information from a phase-difference pixel value, and determines a subject distance, thereby carrying out autofocus control. On the other hand, in the case of moving image recording or live-view display, a moving image frame rate is usually acquired by mixing and outputting a plurality of pixel outputs inside an image sensor. In an image sensor having phase-difference pixels arranged therein, the outputs of the phase-difference pixels are mixed which cannot be used, as is, as an image signal.

Then, it is necessary to increase the gain for correcting the insufficient sensitivity due to a narrow opening of a phase-difference pixel and/or to generate an image signal through the interpolation operation from peripheral pixels. However, because the density of pixels (mixed pixels) each formed by mixing outputs of phase-difference pixels becomes higher than before mixing, the scheme for performing interpolation from peripheral pixels causes a degradation in image quality.

In order to prevent such image quality degradation, a technique has been proposed for improving the image quality by estimating, from an image, the gain applied to a mixed pixel and increasing the gain of the mixed pixel (see Japanese patent laid-open 2013-257494 (hereinafter referred to as "Patent Literature 1")). The gain to be multiplied to a mixed pixel is determined by the aperture ratio of a phase-difference pixel, at the center section of an image, while in the peripheral the gain to be multiplied to a mixed pixel is affected by the pupil position of an optical system, the oblique incidence characteristic of a pixel, and the like and differs from the gain at the center section of the image. This influence depends on the image height in the opening direction (horizontal direction in the case of left and right openings).

The gain multiplied to a mixed pixel value is preferably calculated by comparing the output of a phase-difference pixel and the output of a normal pixel in the peripheral thereof. However, with the technique of Patent Literature 1, when a phase-difference pixel is arranged in a wide area of an image sensor, a pixel with a wide-width area needs to be arranged in the opening direction of the phase difference in order to estimate the gain. When the direction of the phase difference to detect is set not only to the horizontal direction but also to the vertical direction, a phase-difference pixel with an opening of the vertical direction is arranged. In this case, in order to estimate the gain used in correction, a pixel with a wide width needs to be arranged also in the horizontal direction and the vertical direction of the area where the phase-difference pixel is arranged. That is, a pixel with a wide area needs to be arranged for correction of a phase-difference pixel, both in the horizontal direction and in the vertical direction, which causes a significant increase in memories used for calculation and/or an increase in a data transfer quantity.

SUMMARY OF THE INVENTION

The present invention has been made in view of the above circumstances, and aims to provide an imaging device and imaging method that prevent an increase in memories and a degradation in image quality while improving the phase-difference detection performance.

An imaging device according to a first embodiment of the present invention includes: an image sensor including a plurality of imaging pixels and a plurality of focus detection pixels, each of the focus detection pixels having an opening position of a light receiving portion different from each of the imaging pixels; a read-out section which mixes and reads out pixel signals of the image sensor, and outputs a mixed pixel output; and a pixel correction section which corrects the mixed pixel output, wherein in the image sensor, a first focus detection pixel is arranged at a position corresponding to a first color filter of the imaging pixel and a second focus detection pixel is arranged at a position corresponding to a second color filter different from the first color filter of the imaging pixel, wherein in mixing and reading out the outputs of the imaging pixels corresponding to the first color filter, the read-out section mixes a plurality of pixel signals including the output of the first focus detection pixel and reads out a first mixed pixel output, while in mixing and reading out the outputs of the imaging pixels corresponding to the second color filter, the read-out section mixes a plurality of pixel signals without including the output of the second focus detection pixel and reads out a second mixed pixel output, and wherein the pixel correction section corrects the output value of the first mixed pixel output, and does not correct the output value of the second mixed pixel output.

An imaging method according to a second embodiment of the present invention is an imaging method of an imaging device including: a plurality of imaging pixels and a plurality of focus detection pixels, each of the focus detection pixels having an opening position of a light receiving portion different from each of the imaging pixels; a read-out section which mixes and reads out pixel signals of the image sensor, and outputs a mixed pixel output; and a pixel correction section which corrects the mixed pixel output, in which in the image sensor, a first focus detection pixel is arranged at a position corresponding to a first color filter of the imaging pixel and a second focus detection pixel is arranged at a position corresponding to a second color filter different from the first color filter of the imaging pixel, wherein in mixing and reading out the outputs of the imaging pixels corresponding to the first color filter, the read-out section mixes a plurality of pixel signals including the output of the first focus detection pixel and reads out a first mixed pixel output, while in mixing and reading out the outputs of the imaging pixels corresponding to the second color filter, the read-out section mixes a plurality of pixel signals without including the output of the second focus detection pixel and reads out a second mixed pixel output, and wherein the pixel correction section corrects the output value of the first mixed pixel output, and does not correct the output value of the second mixed pixel output.

BRIEF DESCRIPTION OF THE DRAWINGS

FIG. 1A and FIG. 1B are a block diagram mainly illustrating the electric configuration of a camera according to an embodiment of the present invention.

FIG. 3 illustrates the arrangement of phase-difference pixels of a camera according to an embodiment of the present invention.

FIG. 4B illustrates a combination (four-pixel cycle) of the mixing of phase-difference pixels (mixing of B pixels) of a camera according to an embodiment of the present invention.

FIG. 4D illustrates a combination (6-pixel cycle) of the mixing of phase-difference pixels (mixing of B pixels) of a camera according to an embodiment of the present invention.

FIG. 5A and FIG. 5B illustrate the light-shielding characteristic of the phase-difference pixel of a camera according to an embodiment of the present invention, in which FIG. 5A is a graph illustrating the light-shielding rate in an image height direction and FIG. 5B is a graph illustrating the correction gain in the image height direction.

DETAILED DESCRIPTION OF THE PREFERRED EMBODIMENTS

Hereinafter, an example in which the present invention is applied to a digital camera as an embodiment will be described. This digital camera includes an imaging section, in which a subject image is converted into image data by the imaging section, and based on this converted image data, a live-view of the subject image is displayed on a display section arranged on the backside of a main body. A photographer determines a composition and/or shutter chance by observing the displayed live-view. In a release operation, image data is stored on a storage medium. The image data stored on the storage medium can be reproduced and displayed on the display section once a playback mode is selected.

In the image sensor of the present embodiment, a first phase-difference pixel is arranged at a position corresponding to a Gr (green) color filter of an imaging pixel, and a second phase-difference pixel is arranged at a position corresponding to a B (blue) filter of the imaging pixel. In mixing and reading out the outputs of the imaging pixels corresponding to the Gr filter, the image sensor mixes a plurality of pixel signals including the outputs of the first phase-difference pixel and reads out a first mixed pixel output, while in mixing and reading out the outputs of the imaging pixels corresponding to the B filter, the image sensor mixes a plurality of pixel signals without including the outputs of the second phase-difference pixel and reads out a second mixed pixel output. Because the first mixed pixel output includes the first phase-difference image output, this output is corrected and used, while because the second mixed pixel output does not include the second phase-difference image output, this output is used without being corrected (see FIG. 4A to FIG. 4D and the like for the mixing of pixels, and see FIG. 5, FIG. 5B and S49, S51, S55 of FIG. 7A for correction).

Figure 1B:
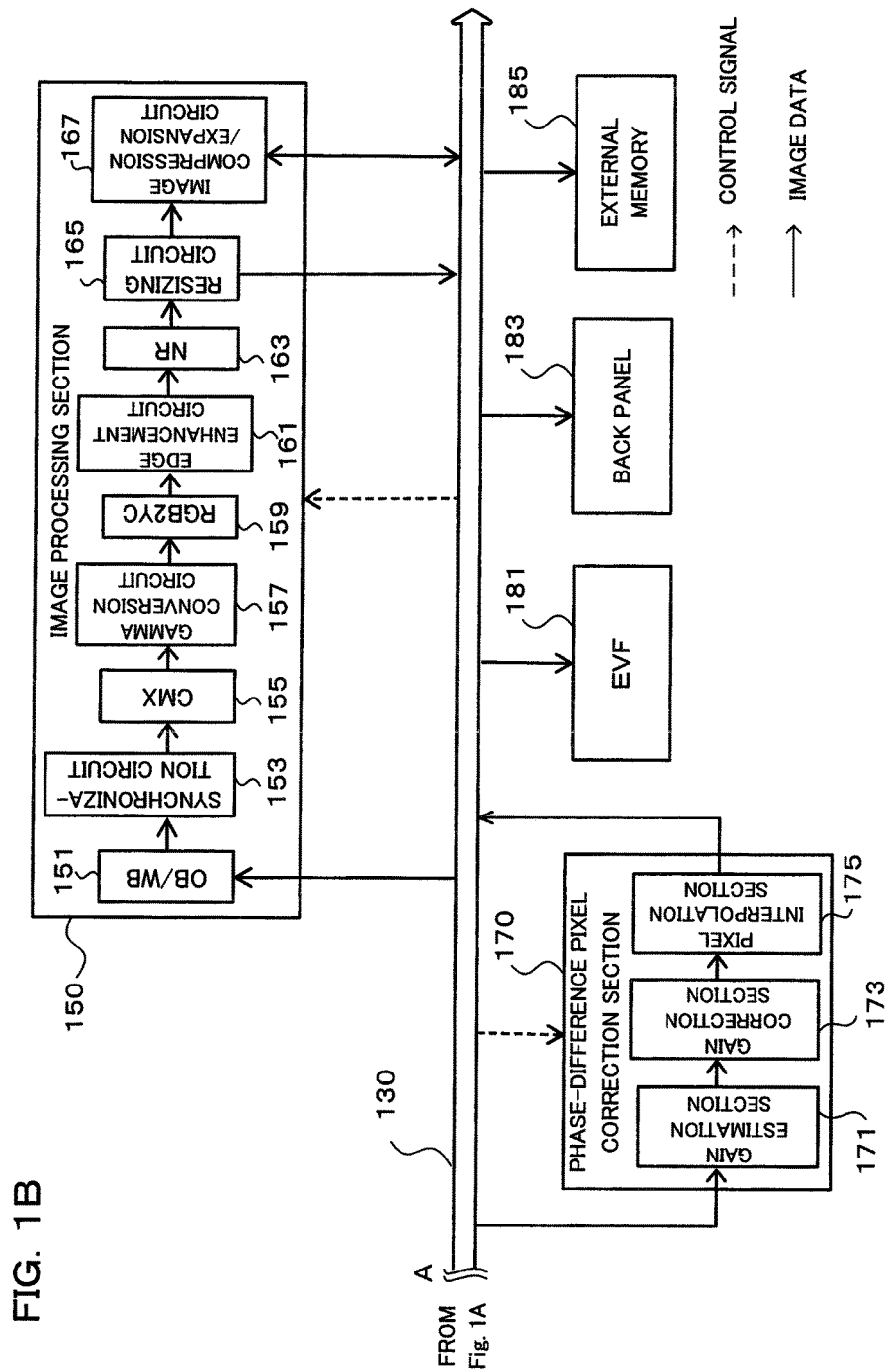

FIG. 1 is a block diagram mainly illustrating the electric configuration of a camera according to an embodiment of the present invention.

A shooting lens 101 includes a plurality of optical lenses for forming a subject image (including a focus lens for focus adjustment), is a single focus lens or a zoom lens, and is arranged inside a fixed or interchangeable lens barrel. Moreover, the shooting lens 101 is movable in an optical axis direction by a focus drive section 103, and the focusing position thereof is controlled by moving a focus lens inside the shooting lens 101 based on a control signal from a CPU (Central Processing Unit) 140 described later, and in the case of a zoom lens, the focal length thereof is also controlled by moving a zoom lens group by a non-illustrated zoom drive section. Note that, the focus drive section 103 includes a focus lens driving mechanism, an actuator for driving this focus lens driving mechanism, and a driver circuit for driving this actuator.

An aperture 105 is arranged in the backward of the optical axis of the shooting lens 101. The aperture 105 has a variable opening diameter and controls the light amount of a subject light flux passing through the shooting lens 101. An aperture drive section 107 controls the opening diameter of the aperture 105 based on a control signal from the CPU 140. Note that, the aperture drive section 107 includes an aperture mechanism for driving the aperture 105, an actuator for driving this aperture driving mechanism, and a driver circuit for driving this actuator.

The subject image formed by the shooting lens 101 is converted into image data by the imaging section 110. This imaging section 110 includes an image sensor 111, an amplifier (A-Gain) 113, an A/D converter 115, a mixer (MIX) 117, and an interface (I/F) 119. The imaging section 110 reads out, via a bus 130, an image signal from the image sensor 111 in response to a control signal from the CPU 140, and processes the same and outputs image data to an imaging processing section 120.

The image sensor 111 is arranged on the optical axis of the shooting lens 101 and near the image forming position of a subject image. The image sensor 111 includes a plurality of pixels each having a photoelectric conversion section which converts a subject image (optical image) into an electric signal. That is, in the image sensor 111, photodiodes constituting each pixel are arranged two-dimensionally in a matrix, each photodiode generates a photoelectric conversion current corresponding to a light receiving amount, and this photoelectric conversion current is accumulated as charges by a capacitor connected to each photodiode. An RGB filter of Bayer arrangement is arranged at the front face of each pixel. The plurality of photodiodes corresponds to the plurality of pixels described above.

Moreover, the plurality of pixels of the image sensor 111 includes a phase-difference pixel (referred to also as a "focus detection pixel") configured to restrict the incidence direction of the light flux entering the pixel, and an imaging pixel configured so that the light flux entering the pixel is less restricted than the phase-difference pixel. This image sensor 111 includes a plurality of imaging pixels and a plurality of focus detection pixels, each of the focus detection pixels having an opening position of a light receiving portion different from each of the imaging pixels. While the image signal from the imaging pixel may be used, as is, to display a subject image, the image signal from the phase-difference pixel needs the correction by interpolation operation, gain correction, or the like because a part of an incident light flux is shielded (see a phase-difference pixel correction section 170 for this correction). The arrangement of the phase-difference pixels and imaging pixels of the image sensor 111 will be described later using FIG. 3.

The output of the image sensor 111 is output to the amplifier 113. The amplifier 113 amplifies, by a predetermined gain, the analog image signal output from the image sensor 111. The output of the amplifier 113 is output to the A/D converter 115. The A/D converter 115 analog-to-digital converts the analog image signal, and outputs the resulting image data to the mixer 117.

At the time of live-view display and/or moving image shooting, the mixer 117 adds the image data from a plurality of pixels, and outputs the result to the I/F 119. The mixer 117 functions as a read-out section which mixes and reads out pixel signals of the image sensor and outputs a mixed pixel output. Moreover, the mixer 117 functions as a read-out section which mixes, in mixing and reading out the outputs of the imaging pixels corresponding to a first color filter (Gr filter in the present embodiment), a plurality of pixel signals including the output of the first focus detection pixel and reads out a first mixed pixel output, and mixes, in mixing and reading out the outputs of the imaging pixels corresponding to a second color filter (B filter in the present embodiment), a plurality of pixel signals without including the output of the second focus detection pixel and reads out a second mixed pixel output (e.g., see FIG. 4A to FIG. 4D). Moreover, the read-out section has a function to read out the pixel signals of an image sensor and output the same without mixing of the pixel signals. Therefore, when the pixel signals are not mixed, image quality can be improved by interpolation with high precision from the peripheral pixels.

Combining of the mixed pixels performed in the mixer 117 will be later described using FIG. 4A to FIG. 4D. Note that, although in the present embodiment, mixing of the signals from pixels is performed after A/D conversion, it may be performed before A/D conversion or may be performed in reading out the image signal from the image sensor 111.

The output of the mixer 117 is output to an I/F 121 of the imaging processing section 120 via the I/F 119. Between the I/F 119 and the I/F 121, image data is communicated at high speed.

The imaging processing section 120 performs various kinds of imaging processing on the image data output from the imaging section 110, in accordance with a control signal from the CPU 140, and outputs the result to the bus 130. The imaging processing section 120 includes the I/F 121, an AF detection circuit 123, an AE/WB circuit 125, and a resizing circuit 127. Note that, although each circuit may serially process the data along the image data flow in the view, each circuit shall be able to separately process the data.

The image data received by the I/F 121 is output to the AF detection circuit 123. The AF detection circuit 123 extracts only the image data from a phase-difference pixel among the image data. As illustrated in FIG. 3 described later, inside the image sensor 111, the imaging pixels (indicated by R, Gr, Gb, and B in the view) and the phase-difference pixels (indicated by LF, RI, TP, and BT in the view) are mixed at a predetermined cycle. Because the pixel data of these pixels are read out in the horizontal direction, the AF detection circuit 123 extracts only the pixel data of the phase-difference pixel. The pixel data of a phase-difference pixel extracted by the AF detection circuit 123 is input to the CPU 140 via the bus 130. The CPU 140 performs the AF calculation based on a phase-difference detection scheme by using the pixel data of a phase-difference pixel. Then, the CPU 140 performs auto-focusing by controlling the movement of the focus lens by the focus drive section 103, based on the result of the AF calculation.

The AE/WB circuit 125 includes an AE circuit and a WB circuit. The AE (Automatic Exposure) circuit detects the signal corresponding to the luminance of a subject from image data, and outputs the same as a luminance signal. Moreover, the WB (White Balance) circuit detects a white balance gain to be multiplied to an R signal and B signal, in order to perform white balance processing on image data.

The resizing circuit 127 changes the size of image data. At the time of live-view display and/or moving image shooting, the image size needs not be so large as at the time of still image shooting. The resizing circuit 127 performs resizing in accordance with the size of an image required in live-view display and/or moving image shooting. Reduction in image size enables quick processing.

The CPU 140 performs the function as the control section of this whole camera, and generally controls the various sequences of the camera in accordance with a program stored on a flash ROM 143. Other than the bus 130, an operating section 141 is connected to the CPU 140.

The operating section 141 includes the operating members, such as various input buttons and various input keys, such as a power button, a release button, a video button, a playback button, a menu button, a cross key, and an OK button, and detects the operation states of these operating members and outputs the detection result to the CPU 140. The CPU 140 performs various sequences in accordance with the operation of a user, based on the detection result of an operating member from the operating section 141.

The flash ROM 143 stores a program for performing various sequences of the CPU 140. The CPU 140 controls the whole camera based on the program.

A DRAM 145 is an SDRAM (Synchronous Dynamic Random Access Memory), for example, and is an electrically rewritable volatile memory for temporary storage of image data and the like. This DRAM 145 temporarily stores the image data output from the imaging section 110 and processed by the imaging processing section 120 and the image data processed in an image processing section 150 or the like described later.

The phase-difference pixel correction section 170 is connected to the bus 130, and performs correction processing on the pixel data from a phase-difference pixel inside the image sensor 111. The phase-difference pixel correction section 170 includes a gain estimation section 171, a gain correction section 173, and a pixel interpolation section 175. Note that each section may serially process the data along the image data flow in the view, but is cable of separately processing the data.

The gain estimation section 171 estimates a gain which is multiplied to the pixel data mixed by the mixer 117. As describes later using FIG. 5A and FIG. 5B, the gain for correction differs depending on the image height position of pixel data, and also differs depending on the focal length, pupil position, or the like. In the present embodiment, the gain is estimated for each frame (or for every several frames) using image data.

The gain correction section 173 multiplies the gain estimated by the gain estimation section 171 to the pixel data mixed by the mixer 117. The gain estimation section 171 and gain correction section 173 function as a pixel correction section which corrects a mixed pixel output. This pixel correction section corrects the output value of the first mixed pixel output, but does not correct the output value of the second mixed pixel output (e.g., see S51 and S55 of FIG. 7A). Moreover, this pixel correction section corrects the output value of the first mixed pixel output, based on the mixed pixel output of only the imaging pixel corresponding to the first color filter positioned in a periphery of the first mixed pixel (e.g., see the description of FIG. 5A and FIG. 5B described later). Therefore, an output difference between a focus detection pixel and an imaging pixel, the output difference varying with the various conditions, such as the focal length and pupil position of a lens, can be accurately corrected to prevent image quality degradation.

The pixel interpolation section 175 performs interpolation processing on the pixel data of a phase-difference pixel using the pixel data of peripheral imaging pixels. In the present embodiment, in the image processing at the time of still image shooting, this interpolation processing is performed on the pixel data of a phase-difference pixel. The pixel interpolation section 175 has a function as a pixel correction section which interpolates the output values of the first and second focus detection pixels using the output values of imaging pixels corresponding to the respective color filters positioned in a periphery of the respective focus detection pixels to calculate the output values of the imaging pixels corresponding to the positions of the first and second focus detection pixels.

The image processing section 150 is connected to the bus 130, and performs the image processing of the image data output from the imaging processing section 120 or phase-difference pixel correction section 170. The image processing section 150 includes an OB/WB circuit 151, a synchronization circuit 153, a color matrix (CMX) circuit 155, a gamma conversion circuit 157, an RGB2YC circuit 159, an edge enhancement circuit 161, an NR circuit 163, a resizing circuit 165, and an image compression/expansion circuit 167. Note that, although each circuit may serially process data along the image data flow in the view, each circuit shall be able to separately process the data.

The OB/WB circuit 151 includes an OB (Optical Black) circuit and a WB (White Balance) circuit. The OB circuit subtracts the pixel data coming from a light-shielding section provided in the image sensor 111 from the pixel data representing a subject image to remove the noise, such as dark current, caused by an image sensor. Moreover, the WB circuit performs the white balance processing of image data as with the WB circuit inside the imaging processing section 120.

The synchronization circuit 153 generates each pixel data of RGB at each pixel position using the data from the respectively different positions. For example, the pixel value of a color component which does not exist for each color is calculated through interpolation from peripheral pixels. The color matrix circuit 135 corrects each data of RGB to ideal image data of RGB taking into consideration the spectral sensitivity characteristic of the image sensor 111, the spectral transmission characteristic of an optical system, and the like.

The gamma conversion circuit 157 performs the correction for keeping substantially linear the amount of light of a subject in shooting with a camera and the display luminance in the display section and at the same time making the gradation characteristic of a displayed image look favorable. The RGB2YC circuit 159 performs the conversion from the color space of RGB to a color space of luminance and color difference. The RGB2YC circuit 157 performs color difference correction after YC conversion, using the RGB image data after gamma conversion.

The edge enhancement circuit 161 performs the image processing for emphasizing the contour part in an image. The NR (Noise Reduction) circuit 163 removes the noise contained in image data by performing the coring processing or the like corresponding to a frequency. The resizing circuit 165 changes the size of image data as with the resizing circuit 127 in the imaging processing section 120. The image compression/expansion circuit 167 performs the compression of JPEG, MPEG, or the like on image data, and also performs the expansion of the compressed data.

An EVF (Electrical View Finder) 181 connected to the bus 130 is an electronic view finder, and performs the live-view display or the like of a subject image based on the image data from the image processing section 150. A user can observe a live-view display or the like by looking into the EVF through an eyepiece section.

A back panel 183 connected to the bus 130 includes a display section, such as a liquid crystal panel, and performs the live-view display or the like of a subject image based on the image data from the image processing section 150. A user can directly observe the back panel 183 without through the eyepiece section.

An external memory 185 connected to the bus 130 is a storage medium freely mounted on a camera body, and includes an electrically-rewritable nonvolatile memory. The image processing section 150 can store the image data which has been image-processed for storage, and read out the image data.

Figure 2:
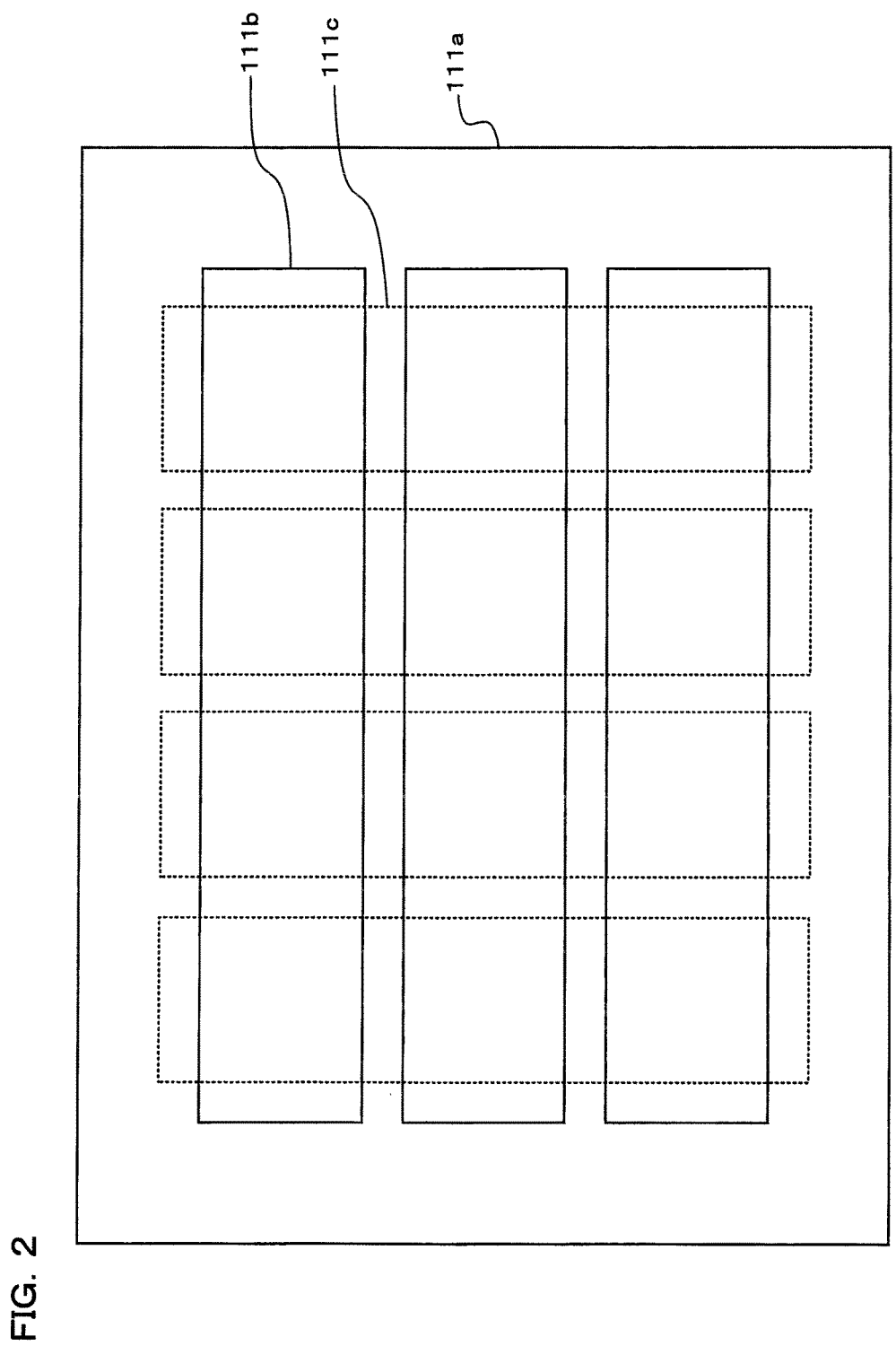
FIG. 2 is a plan view of an image sensor of the camera according to an embodiment of the present invention.

Next, the arrangement of a phase-difference pixel area in the imaging surface of the image sensor 111 will be described using FIG. 2. The rectangle of FIG. 2 indicates an effective pixel area 111a of the image sensor 111. The RGB imaging pixels are arranged in the entire surface of the effective pixel area 111a.

Inside each of LF/RI pixel areas 111b (three areas surrounded by the solid line in the view) elongatedly extending in the horizontal direction, an LF pixel and an RI pixel are arranged at a predetermined cycle between the imaging pixels. The LF pixel is the phase-difference pixel with a left opening, while the RI pixel is the phase-difference pixel with a right opening. In the left opening, the left side is opened with the imaging surface seen from the front, and here the subject light flux from the left side enters the photodiode constituting the pixel. On the other hand, in the right opening, the right side is opened with the imaging surface seen from the front, and here the subject light flux from the right side enters the photodiode constituting the pixel.

Inside each of TP/BT pixel areas 111c (four areas surrounded by the dotted line in the view) elongatedly extending in the vertical direction, a TP pixel and a BP pixel are arranged at a predetermined cycle between the imaging pixels. The TP pixel is the phase-difference pixel with an upper opening, while the BT pixel is the phase-difference pixel with a lower opening. In the upper opening, the upper side is opened with the imaging surface seen from the front, and here the subject light flux toward the upper side enters the photodiode constituting the pixel. On the other hand, in the lower opening, the lower side is opened with the imaging surface seen from the front, and here the subject light flux toward the lower side enters the photodiode constituting the pixel.

An area where the LF/RI pixel area 111b and the TP/BT pixel area 111c overlap with each other is an area where in addition to the RGB imaging pixels, the LF/RI pixel and the TP/BT pixel are mixed. An example of the arrangement of pixels in this mixed area will be described using FIG. 3.

In FIG. 3, R indicates the position of an imaging pixel with an R (red) filter, B indicates the position of an imaging pixel with a B (blue) filter, and Gr or Gb indicates the position of an imaging pixel with a G (green) filter. Moreover, LF indicates the position of the phase-difference pixel with a left opening, while RI indicates the position of the phase-difference pixel with aright opening. Moreover, TP indicates the position of the phase-difference pixel with an upper opening, while BT indicates the position of the phase-difference pixel with a lower opening.

Further, both of the color filters arranged in the first and second focus detection pixels are the first color filters. Because the first focus detection pixel is mixed with the imaging pixel, a filter of the same color needs to be arranged in the focus detection pixel and in the imaging pixel in order to assure color reproducibility. Because the second focus detection pixel is not mixed with the imaging pixel, a filter of the same color as the imaging pixel does not necessarily need to be arranged, but the filter of the same color allows the spectral sensitivity characteristics of the focus detection pixels to be aligned and allows the focus detection accuracy to be improved. Specifically, the first filter is green. Moreover, by setting the second color filter to be blue or red and effectively arranging the focus detection pixels, including the frequency bands which have less effect on resolution, it is possible to increase the density of focus detection pixels, improve the focus detection accuracy, and at the same time prevent a degradation in image quality.

In FIG. 3, the LF phase-difference pixel of (x1, y1) and RI phase-difference pixel of (x5, y1) are paired, and the LF/RI phase-difference pixels are arranged in the y1 row, y5 row, y9 row, and y13 row, respectively. Moreover, the TP phase-difference pixel of (x3, y4) and the BT phase-difference pixel of (x3, y8) are paired, and the phase-difference pixels of TP/BT are arranged in the x3 column, x7 column, x11 column, and x15 column, respectively.

The effective pixel areas 111a inside the image sensor 111 are the following four areas.

(1) Area (area 1) where only the LF/RI phase-difference pixels are arranged.

(2) Area (area 2) where only the TP/BT phase-difference pixels are arranged.

(3) Area (area 3) where all the LF/RI/TP/BT phase-difference pixels are arranged.

(4) Area (area 4) where none of the phase-difference pixels is arranged.

Next, combination of mixing of the pixels performed in the mixer 117 will be described using FIG. 4A to FIG. 4D. Among these views, FIG. 4A and FIG. 4B illustrate an example of the mixing of pixels of a four-pixel cycle, while FIG. 4C and FIG. 4D illustrate an example of the mixing of pixels of a six-pixel cycle.

Figure 4A:
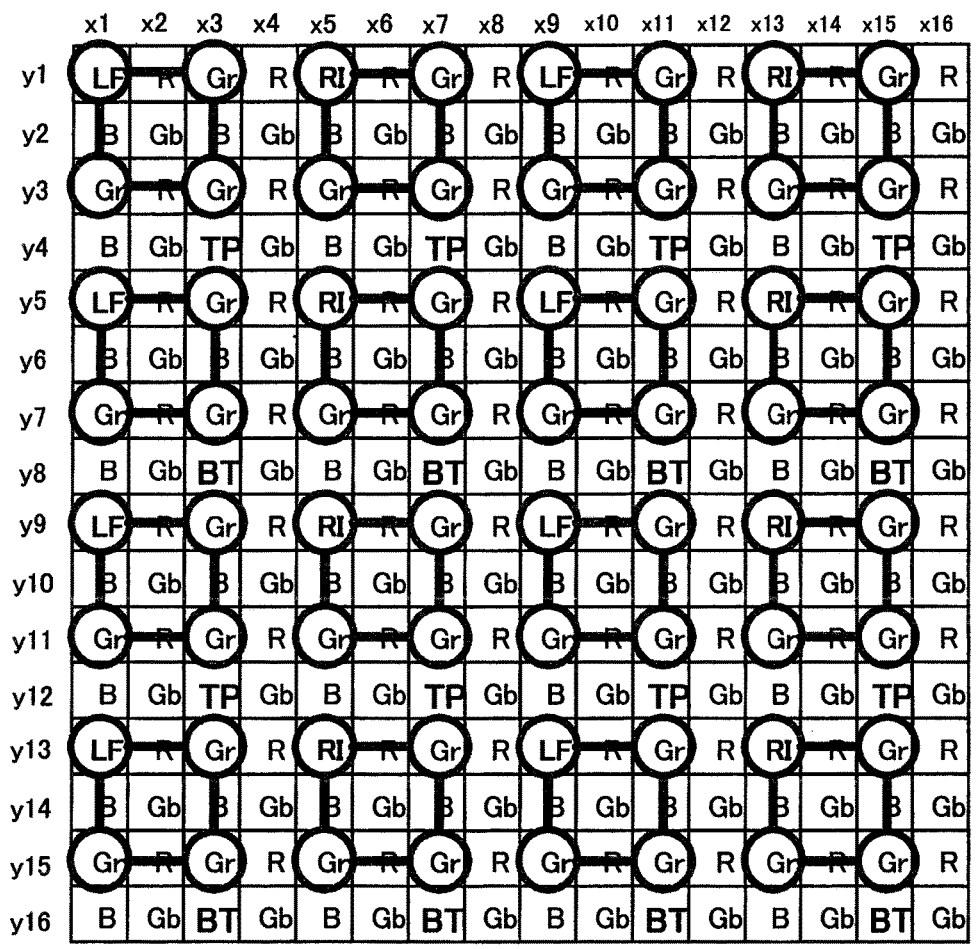
FIG. 4A illustrates a combination (four-pixel cycle) of the mixing of phase-difference pixels (mixing of Gr pixels) of a camera according to an embodiment of the present invention.
Figure 4C:
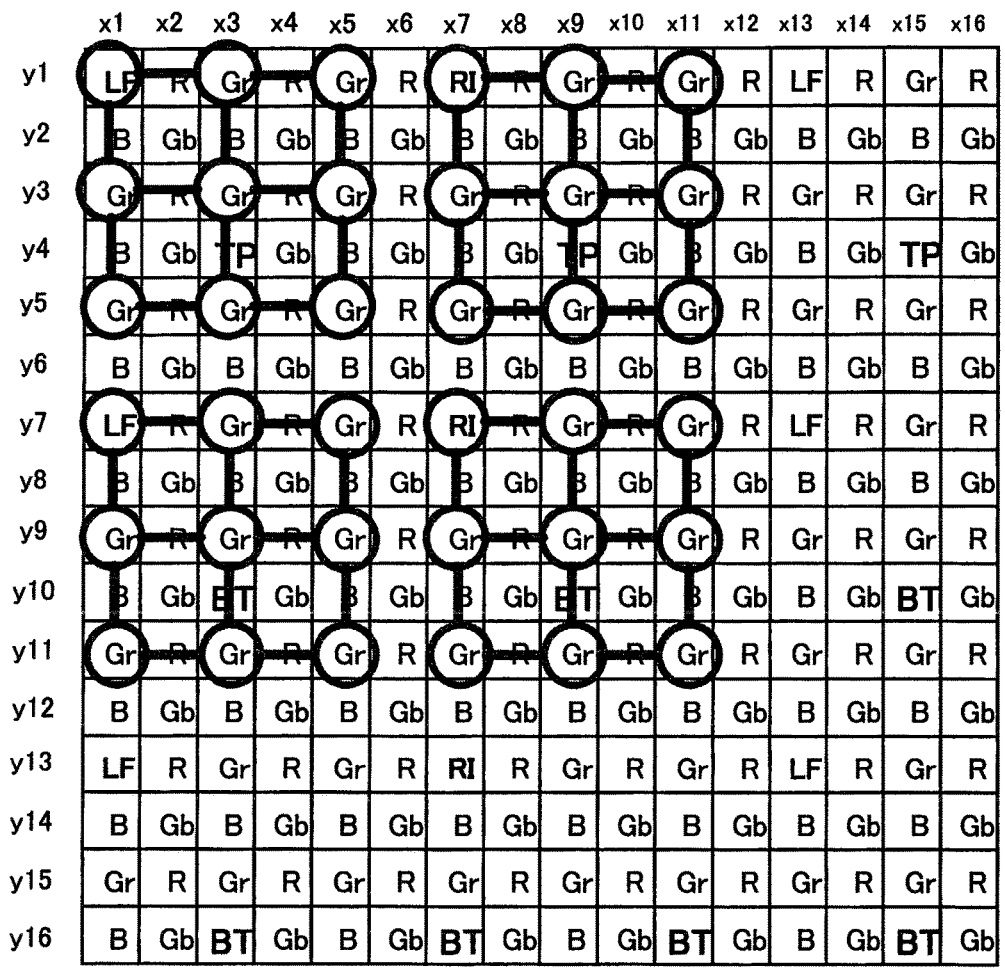
FIG. 4C illustrates a combination (6-pixel cycle) of the mixing of phase-difference pixels (mixing of Gr pixels) of a camera according to an embodiment of the present invention.

FIG. 4A illustrates a combination of pixels to be mixed when the Gr pixels are mixed at a four-pixel cycle. As illustrated in FIG. 4A, for example, the phase-difference pixel LF of (x1, y1) is mixed with three Gr imaging pixels of (x3, y1), (x1, y3), and (x3, y3), and also the phase-difference pixel RI of (x5, y1) is mixed with three Gr imaging pixels of (x7, y1), (x5, y3), and (x7, y3).

As described above, in the example illustrated in FIG. 4A, for the Gr pixel, four pixels are mixed including the LF phase-difference pixel with the left opening or the RI phase-difference pixel with the right opening. Moreover, in each combination pattern, a phase-difference pixel is arranged at the upper left corner of the rectangle, and the Gr imaging pixel is arranged at the other three corners, respectively, and this combination pattern is repeatedly arranged at the same cycle. Note that, the pattern in the present embodiment has a phase-difference pixel arranged at the upper left corner, but not limited thereto, the pattern may have a phase-difference pixel arranged at the lower left, at the upper right, or at the lower right.

FIG. 4B illustrates a combination of pixels to be mixed when the B pixels are mixed at a four-pixel cycle. As illustrated in FIG. 4B, for example, three B imaging pixels of (x1, y2), (x3, y2) and (x1, y4) are mixed. However, the mixing of pixels is performed while avoiding the phase-difference pixels, such as the phase-difference pixel TP of (x3, y4) and the phase-difference pixel BT of (x3, y8).

As described above, in the example illustrated in FIG. 4B, three B pixels are mixed, but the mixing of pixels is performed while avoiding the phase-difference pixels with an upper opening and with a lower opening, respectively. Moreover, in each combination pattern, a pixel is lacked at the lower right corner of the rectangle and the B imaging pixel is arranged at the other three corners, respectively, and this combination pattern is repeatedly arranged at the same cycle. Note that, in the present embodiment, the B pixels are mixed, but when a phase-difference pixel with the upper opening or with the lower opening is arranged at the position of the R pixel, the mixing may be performed similarly for the R pixels. Moreover, the pattern in the present embodiment has a phase-difference pixel arranged at the lower right corner, but not limited thereto, the pattern may have a phase-difference pixel arranged at the upper left, at the upper right, or at the lower left.

FIG. 4C illustrates a combination of pixels to be mixed when the Gr pixels are mixed at a 6-pixel cycle. As illustrated in FIG. 4C, for example, the phase-difference pixel LF of (x1, y1) is mixed with eight Gr imaging pixels of (x3, y1), (x5, y1), (x1, y3), (x3, y3), (x5, y3), (x1, y5), (x3, y5), and (x5, y5), and also the phase-difference pixel RI of (x7, y1) is mixed with eight Gr imaging pixels of (x9, y1), (x11, y1), (x7, y3), (x9, y3), (x11, y3), (x7, y5), (x9, y5), and (x11, y5).

As described above, in the example illustrated in FIG. 4C, for the Gr pixel, six pixels are mixed including the LF phase-difference pixel with the left opening or the RI phase-difference pixel with the right opening. Moreover, in each combination pattern, a phase-difference pixel is arranged at the upper left corner of the rectangle and the Gr imaging pixel is arranged at the other three corners, respectively, and at the intermediate point thereof. This combination pattern is repeatedly arranged at the same cycle. Note that, the pattern in the present embodiment has a phase-difference pixel arranged at the upper left corner, but not limited thereto the pattern may have a phase-difference pixel arranged at the lower left, at the upper right, or at the lower right, or may have a phase-difference pixel arranged at the intermediate point thereof. Moreover, in FIG. 4C, only four sets of combinations of the mixing of pixels are illustrated, but pixels other than these pixels may be mixed similarly.

FIG. 4D illustrates a combination of pixels to be mixed when the B pixels are mixed at a six-pixel cycle. As illustrated in FIG. 4D, for example, eight B imaging pixels of (x1, y4), (x5, y4), (x1, y6), (x3, y6), (x5, y6), (x1, y8), (x3, y8), and (x5, y8) are mixed. However, the mixing of pixels is performed while avoiding the phase-difference pixels, such as the phase-difference pixel TP of (x3, y4) and the phase-difference pixel BT of (x3, y10).

As described above, in the example illustrated in FIG. 4D, eight B imaging pixels are mixed, but the mixing of pixels is performed while avoiding the phase-difference pixels with an upper opening and with a lower opening, respectively. Moreover, in each combination pattern, a pixel is lacked at the midpoint of the upper side of the rectangle, the B imaging pixel is arranged at the other four corners and at the intermediate point thereof, respectively (except the upper side), and this combination pattern is repeatedly arranged at the same cycle.

Note that, in the present embodiment, the B pixels are mixed, but when a phase-difference pixel with the upper opening or with the lower opening is arranged at the position of the R pixel, the mixing may be performed similarly for the R pixels. Moreover, the pattern in the present embodiment has a phase-difference pixel arranged at the intermediate point of the upper side, but not limited thereto the pattern may have a phase-difference pixel arranged at any place of the pixel mixing pattern. Moreover, in FIG. 4D, only four sets of combinations of the mixing of pixels are illustrated, but pixels other than these pixels may be mixed similarly.

In this manner, in the mixing of pixels in the present embodiment, for the Gr pixel, the mixing of pixels is performed including the phase-difference pixel with the left opening or with the right opening, also for the B pixel, the mixing of pixels is performed while avoiding the phase-difference pixels with the upper opening and with the lower opening, respectively. For the Gr pixel, the mixing of pixels is performed including the phase-difference pixel. This is because the Gr pixel has a lot of luminance components and has a larger influence on the resolution and thus becomes a large factor causing image quality degradation, such as moire and/or degradation in resolution, if the mixing of pixels is not performed. Therefore, the phase-difference pixel is included also in performing the mixing of pixels. In contrast, because the B pixel (R pixel as well) has a smaller luminance component and has a smaller influence on the resolution, the phase-difference pixel is not included in performing the mixing of pixels.

Moreover, in the present embodiment, a phase-difference pixel is arranged at the position of a Gr pixel, but even when a phase-difference pixel is arranged at the position of a Gb pixel, the mixing of pixels as with the Gr pixel may also be performed for Gb pixels. As described above, for the Gr/Gb pixels, a phase-difference pixel is included in performing the mixing of pixels, while for B/R pixels a phase-difference pixel is not included in performing the mixing of pixels, so that a sufficient resolution may be acquired and at the same time the calculation processing can be shortened.

Moreover, in the mixing of pixels in the present embodiment, the arrangement is made so that the cycle of a pixel mixing pattern and the cycle of a phase-difference pixel become the same. For example, in FIG. 4A and FIG. 4B, in the pixel mixing pattern, the same pixel is arranged at every four pixels, and also for the cycle of a phase-difference pixel, a phase-difference pixel is arranged at every four pixels. The cycle of a pixel mixing pattern and the cycle of a phase-difference pixel are set the same in this manner, so that the periodicity of the center of gravity position of the mixing of pixels is kept. If the periodicity of the center of gravity position of the mixing of pixels is disordered, the image quality will degrade mainly in terms of the resolution, but in the present embodiment an increase in image quality can be achieved.

Moreover, in the present embodiment, there is an area without a phase-difference pixel. That is, as described above, a certain phase-difference pixel is arranged in the areas 1 to 3, but no phase-difference pixel is arranged in the area 4 (areas other than the LF/RI pixel area 111b and TP/BT pixel area 111c inside the effective area 111a of FIG. 2). Also in this area 4, the mixing of pixels is performed with a pixel mixing pattern with a periodicity as illustrated in FIG. 4A to FIG. 4D. For the B pixel or R pixel, no phase-difference pixel is arranged in the area 4 and therefore in the case of the four-pixel cycle, the mixing of four pixels can also be performed different from the case of FIG. 4B. However, moire generated during mixing differs between the mixing of three pixels and the mixing of four pixels, and therefore when a subject causing moire is shot, the state of generation of moire differs depending on the place of the image, thus causing a sense of incongruity in image quality. Therefore, in order to make uniform the moire generated in each area and to prevent a sense of incongruity from occurring in image quality, the mixing of pixels is performed also in the area 4. In this manner, it is possible to improve the image quality by making uniform the moire.

As described above, in the image sensor 111, the first focus detection pixel is arranged at a position corresponding to the first color filter (Gr filter in the present embodiment) of the imaging pixel and the second focus detection pixel is arranged at a position corresponding to the second color filter (B filter in the present embodiment) different from the first color filter of the imaging pixel. Moreover, the first focus detection pixel is a pixel (phase-difference pixel LF or RI in the present embodiment) having the opening position shifted to the left or right direction relative to the opening position of the imaging pixel, while the second focus detection pixel is a pixel (phase-difference pixel Tp or BT in the present embodiment) having the opening position shifted to the upper or lower direction relative to the opening position of the imaging pixel. Because the light-shielding rate of the focus detection pixel depends on the direction of the opening, the output value of a pixel with the right or left opening is corrected but the output value of a pixel with the upper or lower opening is not corrected, so that the memory capacity for deriving the correction amount in correction can be reduced.

Moreover, the image sensor 111 is arranged at the same cycle as the cycle of the mixing of pixels in which the second focus detection pixels are mixed in the read-out section. Moreover, the image sensor 111 has a pixel area (the aforementioned area 4) where the second focus detection pixel is not arranged, and the read-out section (mixer 117) mixes, regardless of the arrangement state of the second focus detection pixels, pixels at an identical cycle across the whole pixel area, and reads out a mixed pixel output. By aligning the cycle with the pixel mixing pattern, the color moire caused by the mixing of pixels can be made uniform in the screen to eliminate a difference in image quality between an area where the focus detection pixel is arranged and an area where it is not arranged.

Figure 5A:
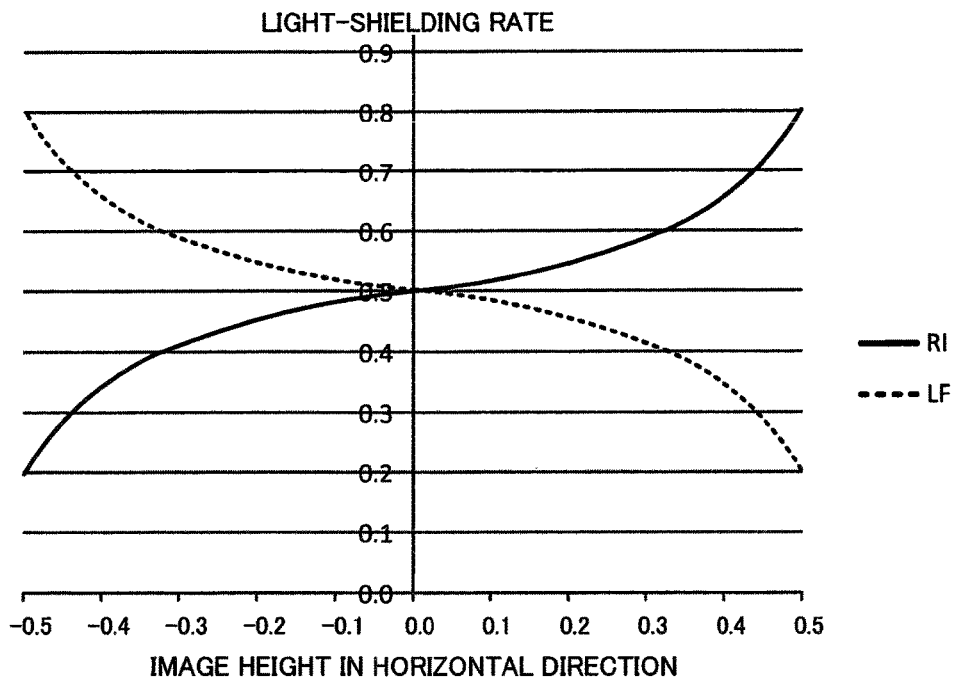

Next, the correction of the mixed pixel including the phase-difference pixel will be described using FIG. 5A and FIG. 5B. The light-shielding rate of the phase-difference pixel depends on the image height (the distance from a center point, the center point being the point intersecting the optical axis of a shooting lens in the imaging surface) in the opening direction. In this case, as illustrated in FIG. 5A, in the case of the phase-difference pixels LF/RI, the light-shielding rate will vary in the horizontal direction. That is, at the image height center position, the light-shielding rate is 0.5, and in the case of the left opening LF, the light-shielding rate decreases from the left side toward the right side, while in the case of the right opening RI, the light-shielding rate increases from the left side toward the right side. Moreover, for the light-shielding rate characteristic with respect to the image height, the shape of the graph illustrated in FIG. 5A will vary depending on the optical characteristics, such as the focal length and pupil position of an interchangeable lens to mount.

For the light-shielding rate, a design value may be stored in advance but the focal length and pupil position of a lens vary depending on the status of use of a user's camera, and therefore the light-shielding rate is preferably detected for each frame (or for every prescribed numbers of frames) at the time of shooting. As the calculation of the light-shielding rate, for example, in the case of the RI phase-difference pixel of (x5, y5) of FIG. 3, the light-shielding rate can be calculated from a ratio of the pixel value of the peripheral Gr pixels ((x3, y3), (x5, y3), (x7, y3), (x3, y5), (x7, y5), (x3, y7), (x5, y7), (x7, y7)) and an RI phase-difference pixel value. Note that, if the light-shielding rate is calculated for each individual phase-difference pixel, it receives the influences from noise, a subject, or the like and will vary, and therefore processing, such as averaging the phase-difference pixel values for each equal image height distance (i.e., the distance from the image height center is equal), may be performed.

The correction gain of the mixed pixel including the phase-difference pixel is theoretically calculated using the following Formula (1) from the light-shielding rate and the number of mixed pixels.

Correction gain=number of mixed pixels/(number of mixed pixels−(1−light-shielding rate)×number of phase-difference pixels)    (1)

Figure 5B:
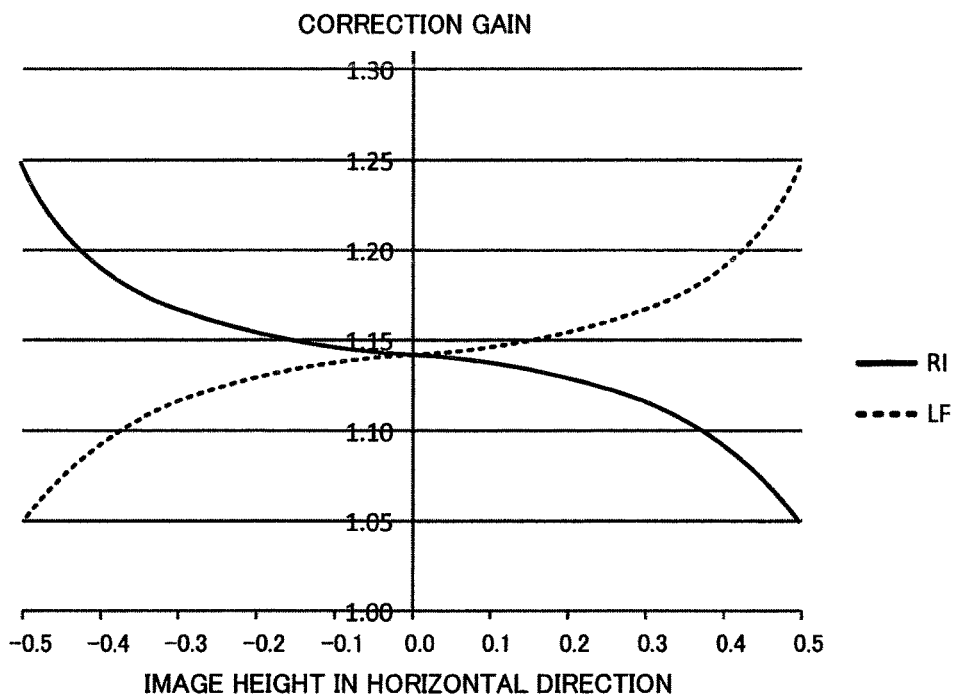

FIG. 5B illustrates the correction gain in the case of mixing four pixels based on the Formula (1) with respect to the light-shielding rate of FIG. 5A.

Here, when a subject image is uniform, an appropriate correction gain can be calculated from the Formula (1), but because a subject image is actually nonuniform, the correction gain may include an error. In such a case, it is effective to detect the pattern of a subject image based on the obtained image data and further correct the correction gain in accordance with the pattern.

Moreover, the phase-difference pixel has, due to a difference in the light-shielding rate, the influence of a crosstalk on a peripheral pixel, the influence being different from the imaging pixel. In order to remove this influence, the following processing may be performed. A correction gain with respect to each image height may be calculated from the ratio between the number of Gr pixels receiving the influence of a phase-difference pixel and the number of Gb pixels residing in a vicinity thereof and not receiving the influence of a phase-difference pixel, from among the obtained image data.

Furthermore, the influences from noise and/or a subject can be reduced by calculating the correction gain for each horizontal line and averaging the calculated correction gains for all the horizontal lines or by approximating the correction gain in an adequate order. The output value of the mixed pixel including all the phase-difference pixels is corrected using the thus calculated correction gain.

Moreover, in the present embodiment, as described above, the correction gain is calculated from image data, but the image height dependence of the light-shielding rate may be measured in advance and stored on the camera body, or may be stored on a lens barrel (interchangeable lens) to mount and be obtained from the lens barrel when a lens is mounted.

Moreover, in the present embodiment, as described above, the phase-difference pixels LF/RI are arranged so as to be paired in the lateral direction (horizontal direction), and also the phase-difference pixels TP/BT are arranged so as to be paired in the longitudinal direction (vertical direction). Then, although the phase-difference pixels LF/RI are added in mixing the Gr pixels, the phase-difference pixels TP/BT are not added in mixing the B pixels. Generally, in the image sensor, an image signal is read out in the lateral direction and stored on a line memory. Therefore, in the phase-difference pixels LF/RI, an image signal is stored on a line memory in the order of being read out, and thus the calculation processing in mixing the pixels is easy to be performed. In contrast, because the phase-difference pixels TP/BT are paired in the longitudinal direction, the calculation processing in mixing the pixels is difficult to be performed. In the present embodiment, because the vertically arranged phase-difference pixels TP/BT are not used in mixing the pixels, the mixing of pixels and the calculation of a correction gain can be quickly processed.

Next, the operation of a camera according to the present embodiment will be described using the flow charts illustrated in FIG. 6, FIG. 7A, and FIG. 7B. Note that, in the flow charts illustrated in FIG. 6, FIG. 7A, and FIG. 7B, the CPU 140 controls each section in accordance with a program stored on the flash ROM 143 and executes the program. Moreover, these flow charts describe only the operations involved in still image shooting and moving image shooting among the operations of a camera but omit other operations.

First, the operation of still image shooting will be described using FIG. 6. In still image shooting, the image signals of all the pixels are read out from the image sensor 111, and the mixing of pixels described using FIG. 4A to FIG. 4D will not be performed.

Figure 6:
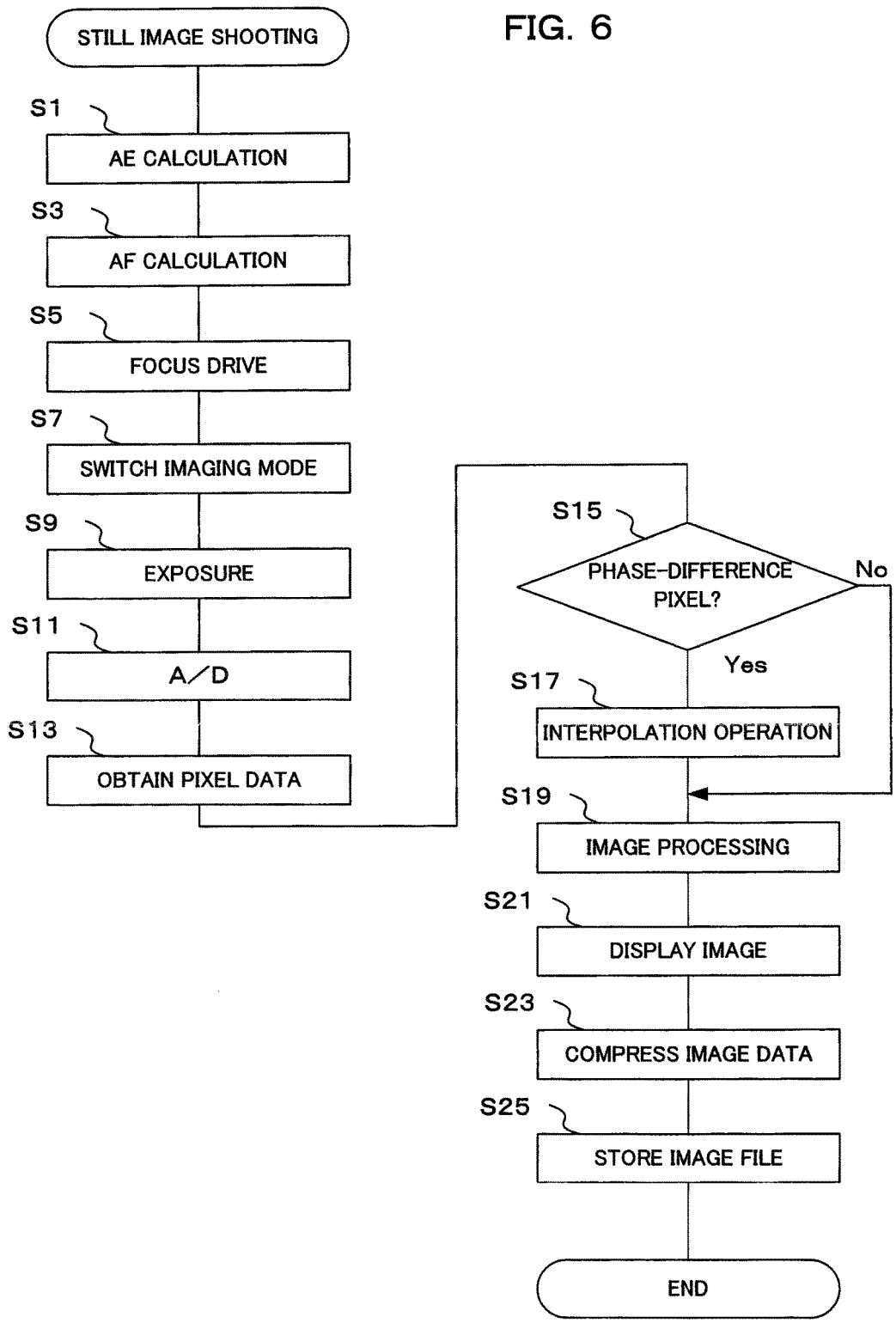
FIG. 6 is a flow chart illustrating the operation of still image shooting of a camera according to an embodiment of the present invention.

Upon full-press or the like of the release button of the operating section 141, the flow of still image shooting illustrated in FIG. 6 starts. First, AE calculation is performed (S1). Here, the CPU 140 calculates the exposure control values, such as the aperture and shutter speed, using the luminance information calculated from image data.

Once the AE calculation is performed, then AF calculation is performed (S3). Here, the pixel data from a phase-difference pixel arranged in the image sensor 111 is extracted by the AF detection circuit 123, and the defocusing direction and defocusing amount of the shooting lens 101 are calculated by a phase-difference method using this extracted pixel data.

Once the AF calculation is performed, then the focus drive is performed (S5). Here, based on the defocusing direction and defocusing amount calculated in step S5, the focusing position of the shooting lens 101 is controlled.

Once the focus drive is performed, then the imaging mode is switched (S7). Here, the operation mode of the image sensor 111 is changed from an AF mode to a still image shooting mode.

Once the imaging mode is switched, then exposure is performed (S9). Here, a shutter is opened for the purpose of shooting a still image and a subject image is formed on the image sensor 111, and each photodiode accumulates charges through photo-electric conversion. Once an exposure time determined by the shutter speed is complete, the exposure is complete.

Once the exposure is complete, then A/D conversion is performed (S11). Here, an image signal is read out from the image sensor 111, and the A/D converter 115 converts this image signal into digital image data. Once the A/D conversion is complete, then the pixel data is obtained (S13). Here, the A/D-converted image data is taken into the imaging processing section 120, and is transferred to the DRAM 145 via the bus 130 without being subjected to the processing, such as AF detection and AE/WB.

Once the pixel data is obtained, then it is determined whether or not the pixel data is of a phase-difference pixel (S15). Here, it is determined whether the pixel data is of the phase-difference pixel with a left opening LF, the phase-difference pixel with a right opening RI, the phase-difference pixel with an upper opening TP, or the phase-difference pixel with a lower opening BT.

If this is a phase-difference pixel as the result of the determination in step S15, then interpolation operation is performed (S17). In the phase-difference pixel, because a half of the upper portion of the photodiode which is the pixel is light-shielded by an opening, the amount of light entering the photodiode is less than in the case of a normal imaging pixel. Then, the pixel interpolation section 175 performs the interpolation operation using the pixel data of a pixel in a vicinity of (around) the phase-difference pixel.

Note that, steps S15 and S17 are repeatedly executed for each pixel data, and are performed on all the pixels data. Once the interpolation operation is performed in step S17, or if it is not a phase-difference pixel as the result of the determination in step S15, then image processing is performed (S19). Here, the image processing section 150 performs the image processing, such as OB correction, WB correction, synchronization processing, color matrix operation, gamma conversion, edge enhancement, and noise reduction, for recording a still image.

Once image processing is performed, then an image is displayed (S21). Here, using the image data which has been image-processed in step S19, a recorded image is displayed on the EVF 181 and/or back panel 183 for a predetermined time period.

Once the image display is complete, then the image data compression is performed (S23). Here, the image compression/expansion circuit 167 compresses the image data which has been image-processed in step S19. Once the image data is compressed, then an image file is stored (S25). Here, the image data compressed in step S23 is stored on the external memory 185. Once the image file is stored, then the flow of still image shooting is completed.

As described above, in still image shooting in the present embodiment, the defocusing direction and defocusing amount are calculated by a phase-difference AF using the pixel data of a phase-difference pixel of the image sensor 111, and the focus lens is driven to a focusing position using this data (S3, S5). Moreover, when the read-out pixel data is the pixel data of a phase-difference pixel, the level of the read-out pixel data is corrected to a level comparable to the level of the pixel data of a normal imaging pixel by the interpolation operation (S17). However, in the case of still image shooting, the mixing of pixels is not performed.

Note that, in the present embodiment, the flow of still image shooting is assumed to be started by fully-depressing the release button, but not limited thereto and, for example, steps S1 to S5 may be performed by half-pressing the release button and then steps S7 and thereafter may be performed in response to fully-pressing of the release button.

Next, the operation of moving image shooting will be described using FIG. 7A and FIG. 7B. In the present embodiment, in the case of moving image shooting of a full-HD mode, the mixing of pixels described using FIG. 4A to FIG. 4D is performed on the pixel data read out from the image sensor 111.

Figure 7A:
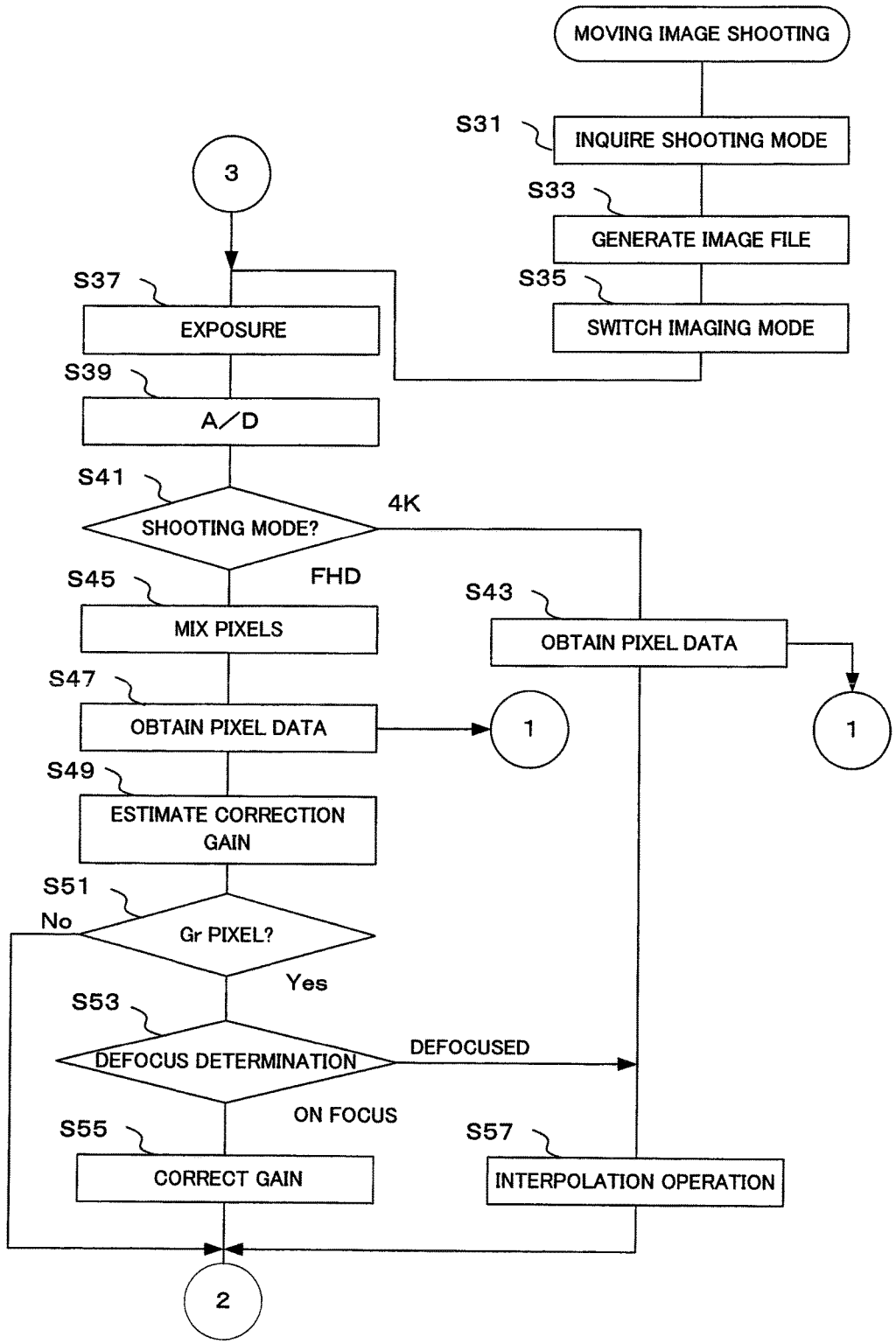
FIG. 7A and FIG. 7B are a flow chart illustrating the operation of moving image shooting of a camera according to an embodiment of the present invention.

Upon operation of the video button of the operating section 141, the flow of moving image shooting illustrated in FIG. 7A is started. First, the shooting mode is inquired (S31). In the present embodiment, a full-HD mode and a 4K mode can be set as the moving image shooting mode. In this step, which mode a user has set is detected. Once the imaging mode is inquired, then an image file is generated (S33). Here, a file header and the like of an image file for moving image recording in accordance with the imaging mode are generated on the external memory 185 to prepare for recording image data.

Once the image file is generated, then imaging mode switching in accordance with the shooting mode is performed (S35). Here, depending on the inquiry result of the shooting mode in step S33, the operation mode of the image sensor 111 is switched to the full-HD mode or 4K mode.

Once the imaging mode is switched, then exposure is started (S37). Here, exposure for moving image is performed. That is, each photodiode photoelectrically converts a subject image formed on the image sensor 111 to accumulate charges. Every time the exposure time determined by an electronic shutter speed ends, the charge is read out as an image signal, and once read out, the next exposure will start.

If the exposure is performed and the image signal is read out, then A/D conversion is performed (S39). Here, the A/D converter 115 converts into digital image data the image signal read out from the image sensor 111.

If the A/D conversion is complete, then it is determined whether the shooting mode is 4K or full HD (FHD) (S41). Here, the determination is made in accordance with the result of the shooting mode inquiry of step S33. In the present embodiment, when the shooting mode is 4K, the image signal read out from the image sensor 111 is used without performing the mixing of pixels, while in the case of the full-HD mode the mixing of pixels is performed.

When the shooting mode is 4K as the result of determination in step S41, pixel data is obtained (S43). The 4K mode is for a high definition image, and here the mixing of pixels will not be performed. That is, the imaging processing section 120 performs the imaging processing on the image data, which has been read out from the image sensor 111 and A/D-converted, to obtain pixel data. As with a still image, neither the AF detection nor the AE/WB processing is performed, but when the size of a shot image differs from an image size to store, the shot image is resized to the image size to store, by the resizing circuit 127.

On the other hand, if the shooting mode is the full-HD mode as the result of the determination in step S41, the mixing of pixels is performed (S45). Here, the mixer 117 performs the mixing of pixels on the pixel data, which has been read out from the image sensor 111 and A/D-converted, as described using FIG. 4A to FIG. 4D. Once the mixing of pixels is performed, then pixel data is obtained (S47). Here, the imaging processing section 120 performs the imaging processing on the image data to obtain pixel data. As with a still image, neither the AF detection nor the AE/WB processing is performed, but when the size of a shot image differs from an image size to store, the shot image is resized to the image size to store, by the resizing circuit 127.

Upon obtaining the pixel data in step S47, then a correction gain is estimated (S49). Here, the gain estimation section 171 calculates a correction gain using the aforementioned Formula (1). Note that, in order to calculate the correction gain, the light-shielding rate is calculated for each frame or for each prescribed frames of the image data for moving images to calculate the correction gain.

Upon calculating the correction gain, then it is determined whether or not the mixed pixels are Gr pixels (S51). Here, it is determined whether or not the mixed and read-out pixels are Gr pixels. As described above, gain correction is performed when the mixed pixels are Gr pixels, while when the mixed pixels are B pixels or R pixels, pixel data, as is, is used in moving image shooting, without performing the gain correction. When the mixed pixels are Gr pixels, the gain correction or interpolation operation is performed in steps S53 and thereafter.

When the mixed pixels are Gr pixels as the result of this determination, defocus determination is performed (S53). Here, it is determined based on the result of the AF calculation in step S73 described later. In the present embodiment, in a portion being in focus inside an image, a correction gain is multiplied to the image data of mixed pixels, thereby calculating the pixel data at the position of a Gr pixel from which the influence of the mixed phase-difference pixels has been removed. On the other hand, in a portion being out of focus inside an image, interpolation operation is performed using the pixel data of mixed Gb pixels positioned in a periphery of Gr pixels which have been mixed including this phase-difference pixel.

As the result of the determination in step S53, if a portion is regarded as being on-focus, i.e., being in focus, then the gain correction is performed (S55). Here, the gain correction section 173 performs the gain correction using the correction gain calculated in step S49. Note that, the procedure of steps from S51 to S57 is repeatedly executed for each pixel data, and is performed on all the pixel data.

As the result of the determination in step S53, if a portion is being defocused, i.e., being out of focus, in the FHD mode, or once pixel data is obtained in the 4K mode in step S43, then the interpolation operation is performed (S57). Here, the pixel interpolation section 175 performs the interpolation operation using the peripheral pixel data.

Figure 7B:
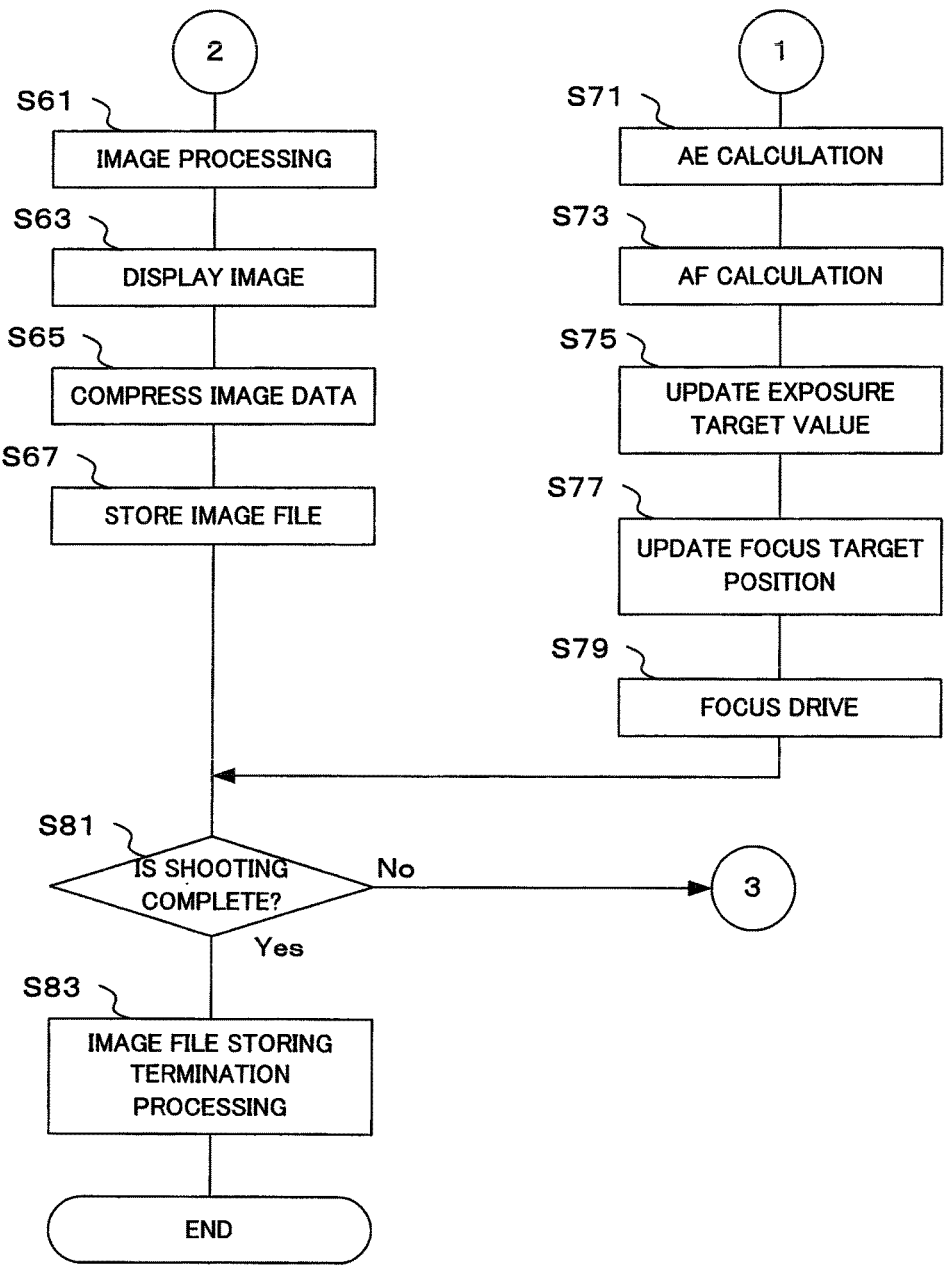

Moreover, once pixel data is obtained in step S43 or S47, then steps S71 to S79 of FIG. 7B are performed in parallel to steps S49 to S67. First, the AE calculation is performed (S71). Here, the CPU 140 calculates the exposure control values, such as the aperture and ISO sensitivity, using the luminance information calculated from the image data obtained in step S43 or S47.

Once the AE calculation is complete, then the AF calculation is performed (S73). Here, the pixel data from the phase-difference pixel arranged in the image sensor 111 is extracted by the AF detection circuit 123, and the defocusing direction and defocusing amount of the shooting lens 101 are calculated by a phase-difference method using this extracted pixel data.

Once the AF calculation is complete, then an exposure target value is updated (S75). Here, the exposure control value calculated in step S71 is updated as the target value to control the aperture and the like. Once the exposure target value is updated, then a focus target position is updated (S77). Here, the defocusing direction and defocusing amount calculated in step S73 are updated as the focus target position.

Once the focus target position is updated, then focus drive is performed (S79). Here, the focusing position of the shooting lens 101 is controlled based on the defocusing direction and defocusing amount updated in step S77.

Once the gain correction is performed in step S55 illustrated in FIG. 7A, or once the interpolation operation is performed in step S57, or if it is not a Gr pixel as the result of the determination in step S51, image processing is performed (S61 of FIG. 7B). Here, the image processing section 150 performs the image processing, such as OB correction, WB correction, synchronization processing, color matrix operation, gamma conversion, edge enhancement, and/or noise reduction, for moving image storing.

Once the image processing is performed, then the image display is performed (S63). Here, using the image data which has been image-processed in step S63, the moving image to be stored is displayed on the EVF 181 and back panel 183.

Once the image display is complete, then the image data compression is performed (S65). Here, the image compression/expansion circuit 167 compresses the image data which has been image-processed in step S63. Once the compression of the image data is complete, then an image file is stored (S67). Here, the image data compressed in step S65 is stored on the external memory 185 using the image file prepared in step S31.

Once the image file is stored in step S67, or once the focus drive is performed in step S79, then it is determined whether or not the shooting is complete (S81). When a user completes moving image shooting, the video button is operated again. Here, it is determined based on the operation state of the video button. If the shooting is not complete as the result of this determination, the flow returns to step S37 to continue moving image shooting.

On the other hand, if the shooting is complete as the result of the determination in step S81, image file storing termination processing is performed (S83). Here, the processing for completing moving image storing, such as closing a moving image file on the external memory 185, is performed. Once the storing termination processing is complete, then the flow of moving image shooting is completed.

As described above, in the operation of moving image shooting in the present embodiment, if the mixed pixels are Gr pixels (Yes in S51), the gain correction is performed (S55). On the other hand, if the mixed pixels are not Gr pixels (No in S51), the pixel data, as is, is used without performing the gain correction.

Note that, in the case of the live-view display, in the operation of moving image shooting illustrated in FIG. 7A and FIG. 7B, the shooting mode is set to the full-HD mode or to a mode, in which an image size is set smaller than the full-HD mode, and the image file storing step and the like just need to be omitted.

As described above, in one embodiment of the present invention, there is provided an imaging device including: an image sensor (e.g., image sensor 111) including a plurality of imaging pixels and a plurality of focus detection pixels, each of the focus detection pixels having an opening position of a light receiving portion different from each of the imaging pixels; a read-out section (e.g., seethe mixer 117) which mixes and reads out pixel signals of the image sensor, and outputs a mixed pixel output; and a pixel correction section (e.g., phase-difference pixel correction section 170) which corrects the mixed pixel output. In the image sensor, a first focus detection pixel (e.g., phase-difference pixel LF/RI) is arranged at a position corresponding to a first color filter (e.g., G filter) of the imaging pixel, and a second focus detection pixel (e.g., phase-difference pixel TP/BT) is arranged at a position corresponding to a second color filter (e.g., B filter) different from the first color filter of the imaging pixel. In mixing and reading out the outputs of the imaging pixels corresponding to the first color filter (e.g., Yes in S51 of FIG. 7A), the read-out section mixes a plurality of pixel signals including the output of the first focus detection pixel and reads out a first mixed pixel output, while in mixing and reading out the outputs of the imaging pixels corresponding to the second color filter (e.g., No in S51 of FIG. 7A), the read-out section mixes a plurality of pixel signals without including the output of the second focus detection pixel and reads out a second mixed pixel output. The pixel correction section corrects the output value of the first mixed pixel output (e.g., S55 of FIG. 7A), but does not correct the output value of the second mixed pixel output. As described above, in the present embodiment, a focus detection pixel is arranged in a plurality of color channels, respectively, so that the density of the focus detection pixels can be increased and the focus detection accuracy can be improved. Moreover, by having a color channel which does not mix the focus detection pixels, it is also possible to achieve a speed up of the pixel correction processing and reduce the memories used for calculation.

Note that, in one embodiment of the present invention, an example has been described in which the mixing of pixels is applied to the full-HD mode of a moving image, but the mixing of pixels may be performed in a still image, or the mixing of pixels may be applicable to the case of another moving image moving image or in the case of the live-view display.

Moreover, in an embodiment of the present invention, the phase-difference pixels LF/RI are arranged at the position of the Gr pixel (or Gb pixel), respectively, and the phase-difference pixels TP/BT are arranged at the position of the B pixel (or R pixel), respectively, but the phase-difference pixels LF/RI may be arranged also at the position of the B pixel (or R pixel), respectively. Moreover, the phase-difference pixels TP/BT may be arranged both at the position of the Gr pixel (or Gb pixel) and at the position of the B pixel (or R pixel), respectively.

Moreover, in an embodiment of the present invention, each section of the phase-difference pixel correction section 170 and the like is configured separately from the CPU 140, but all of or a part of each section may be configured from software, which may be performed by the CPU 140, or of course all of or a part of each section may be constituted from hardware.

Further, an embodiment of the present invention has been described using, as a device for shooting, a digital camera, but as a camera it is also possible to use a digital single lens reflex camera, or a compact digital camera, or a camera for movie use, such as a video camera or a movie camera, and further to use a camera that is incorporated into a mobile phone, a smartphone, a personal digital assist (PDA), a personal computer (PC), a tablet computer, a game console or the like. In any event, it is possible to adopt the present invention as long as a device has a phase-difference pixel arranged in the image surface of an image sensor.

Also, among the techniques that have been described in this specification, with respect to the control that has been described mainly using flow charts, there are many instances where setting is possible using programs, and such programs may be held in a storage medium or storage section. The manner of storing the programs in the storage medium or storage section may be to store at the time of shipping products, or by using a distributed storage medium, or they may be downloaded via the Internet.

Also, regarding the operation flows in the patent claims, the specification and the drawings, for the sake of convenience description has been given using words representing sequence, such as "first" and "next", but at places where it is not particularly described, this does not mean that implementation must be in this order.

As understood by those having ordinary skill in the art, as used in this application, 'section', 'unit,' 'component,' 'element,' 'module,' 'device,' 'member,' 'mechanism,' 'apparatus,' 'machine,' or 'system' may be implemented as circuitry, such as integrated circuits, application specific circuits ("ASICs"), field programmable logic arrays ("FPLAs"), etc., and/or software implemented on a processor, such as a microprocessor.

The present invention is not limited to the embodiments, and structural elements may be modified in actual implementation within the scope of the gist of the embodiments. It is also possible to form various inventions by suitably combining the plurality of structural elements disclosed in the embodiments. For example, it is possible to omit some of the structural elements shown in the embodiments. It is also possible to suitably combine structural elements from different embodiments.

What is claimed is:

1. An imaging device comprising:
an image sensor including a plurality of imaging pixels and a plurality of focus detection pixels, each of the focus detection pixels having an opening position of a light receiving portion different from each of the imaging pixels;
a read-out section which mixes and reads out pixel signals of the image sensor, and outputs a mixed pixel output; and
a pixel correction section which corrects the mixed pixel output, wherein
in the image sensor, a first focus detection pixel is arranged at a position corresponding to a first color filter of the imaging pixel and a second focus detection pixel is arranged at a position corresponding to a second color filter different from the first color filter of the imaging pixel, wherein
in mixing and reading out the outputs of the imaging pixels corresponding to the first color filter, the read-out section mixes a plurality of pixel signals including the output of the first focus detection pixel and reads out a first mixed pixel output, while in mixing and reading out the outputs of the imaging pixels corresponding to the second color filter, the read-out section mixes a plurality of pixel signals without including the output of the second focus detection pixel and reads out a second mixed pixel output, and wherein
the pixel correction section corrects the output value of the first mixed pixel output, and does not correct the output value of the second mixed pixel output.

2. The imaging device according to claim 1, wherein both of the color filters arranged in the first and second focus detection pixels are the first color filters.

3. The imaging device according to claim 1, wherein the first color filter is green and the second color filter is blue or red.

4. The imaging device according to claim 1, wherein the pixel correction section corrects the output value of the first mixed pixel output based on the mixed pixel output of only the imaging pixels corresponding to the first color filter positioned on a periphery of the first mixed pixels.

5. The imaging device according to claim 4, wherein the first focus detection pixel is a pixel having an opening position shifted to a left or right direction relative to an opening position of the imaging pixel, while the second focus detection pixel is a pixel having an opening position shifted to an upper or lower direction relative to an opening position of the imaging pixel.

6. The imaging device according to claim 1, wherein the image sensors are arranged at a same cycle as a cycle of the mixing of pixels in which the second focus detection pixel is mixed by the read-out section.

7. The imaging device according to claim 6, wherein the image sensor has a pixel area where the second focus detection pixel is not arranged, and wherein the read-out section mixes pixels at a same cycle in a whole pixel area and reads out a mixed pixel output, regardless of an arrangement state of the second focus detection pixels.

8. The imaging device according to claim 1, wherein
the read-out section additionally has a function to read out the pixel signals of an image sensor and output a pixel output without mixing pixel signals, and wherein
the pixel correction section interpolates the output values of the first and second focus detection pixels using output values of imaging pixels corresponding to the respective filters positioned in a periphery of the respective focus detection pixels to calculate output values of imaging pixels corresponding to positions of the first and second focus detection pixels.

9. An imaging method of an imaging device including: a plurality of imaging pixels and a plurality of focus detection pixels, each of the focus detection pixels having an opening position of a light receiving portion different from each of the imaging pixels; a read-out section which mixes and reads out pixel signals of the image sensor, and outputs a mixed pixel output; and a pixel correction section which corrects the mixed pixel output, in which in the image sensor, a first focus detection pixel is arranged at a position corresponding to a first color filter of the imaging pixel and a second focus detection pixel is arranged at a position corresponding to a second color filter different from the first color filter of the imaging pixel, wherein
in mixing and reading out the outputs of the imaging pixels corresponding to the first color filter, the read-out section mixes a plurality of pixel signals including the output of the first focus detection pixel and reads out a first mixed pixel output, while in mixing and reading out the outputs of the imaging pixels corresponding to the second color filter, the read-out section mixes a plurality of pixel signals without including the output of the second focus detection pixel and reads out a second mixed pixel output, and wherein
the pixel correction section corrects the output value of the first mixed pixel output, and does not correct the output value of the second mixed pixel output.

* * * * *